US 7,871,675 B2
Jan. 18, 2011

(12) United States Patent
Stanjek et al.

(54) SILANE-CROSSLINKABLE COATING FORMULATIONS

(75) Inventors: Volker Stanjek, Munich (DE); Silvia Jung-Rosseti, Munich (DE); Felicitas Schauer, Oberpframmern (DE)

(73) Assignee: Wacker Chemie AG, Munich (DE)

( * ) Notice: Subject to any disclaimer, the term of this patent is extended or adjusted under 35 U.S.C. 154(b) by 241 days.

(21) Appl. No.: 11/972,762

(22) Filed: Jan. 11, 2008

(65) Prior Publication Data

US 2008/0160200 A1 Jul. 3, 2008

Related U.S. Application Data

(63) Continuation of application No. 10/523,873, filed as application No. PCT/EP03/08784 on Aug. 7, 2003, now Pat. No. 7,357,960.

(30) Foreign Application Priority Data

Aug. 14, 2002 (DE) ................. 102 37 270

(51) Int. Cl.
*C08G 77/26* (2006.01)
(52) U.S. Cl. .......... 427/387; 428/447; 528/26; 528/28; 528/29; 528/25; 528/38; 528/34
(58) Field of Classification Search ......... 427/387; 528/25, 26, 28, 29, 38, 34; 428/447
See application file for complete search history.

(56) References Cited

U.S. PATENT DOCUMENTS

| 3,494,951 | A | 2/1970 | Berger |
|---|---|---|---|
| 3,895,043 | A | 7/1975 | Wagner et al. |
| 4,043,953 | A | 8/1977 | Chang et al. |
| 4,405,679 | A | 9/1983 | Fujioka et al. |
| 4,654,428 | A | 3/1987 | Kurashima et al. |
| 4,988,759 | A | 1/1991 | Den Hartog et al. |
| 5,025,049 | A | 6/1991 | Takarada et al. |
| 5,252,660 | A | 10/1993 | Hazan et al. |
| 5,306,759 | A | 4/1994 | Sakagami et al. |
| 5,902,847 | A | 5/1999 | Yanagi et al. |
| 6,790,903 | B1 | 9/2004 | Majolo et al. |
| 2001/0036554 | A1 | 11/2001 | Jin et al. |
| 2005/0119421 | A1 | 6/2005 | Schindler et al. |

FOREIGN PATENT DOCUMENTS

| DE | 2 155 258 | | 5/1973 |
|---|---|---|---|
| DE | 3544601 | A1 | 6/1986 |
| EP | 0 044 049 | A1 | 1/1982 |
| EP | 0 267 698 | | 5/1988 |
| EP | 0 549 543 | | 7/1993 |
| EP | 0 571 073 | A2 | 11/1993 |
| EP | 1 123 951 | A2 | 8/2001 |
| JP | 50078639 | | 6/1975 |
| JP | 61289094 | A | 12/1986 |
| JP | 02251231 | A | 10/1990 |
| JP | 2002188039 | A | 7/2002 |
| JP | 2002226777 | A | 8/2002 |
| JP | 2005514504 | | 5/2005 |
| JP | 60170672 | A | 10/2009 |
| WO | 92/05225 | | 4/1992 |

*Primary Examiner*—Margaret G Moore
(74) *Attorney, Agent, or Firm*—Brooks Kushman P.C.

(57) ABSTRACT

Moisture curable compositions which cure to produce hard coatings contain prepolymers bearing alkoxysilyl groups of the formula

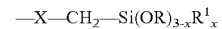

—X—CH$_2$—Si(OR)$_{3-x}$R$^1_x$ where X is —O— or —O—CO—NR"—. The compositions are storage stable and can be cured without use of tin catalysts.

20 Claims, No Drawings

SILANE-CROSSLINKABLE COATING FORMULATIONS

This application is a continuation of U.S. application Ser. No. 10/523,873 filed Feb. 7, 2005 now U.S. Pat. No. 7,357,960 as a U.S. National Phase of PCT Application No. PCT/EP03/08784, filed Aug. 7, 2003, and claims priority to German Application No. 10 237 270.5, filed Aug. 14, 2002.

BACKGROUND OF THE INVENTION

1. Field of the Invention

The invention pertains to the use of silane-crosslinkable coating formulations having good curing properties, which produce scratch resistance coatings.

2. Background Art

At present there is a great need for scratch-resistant coatings for a wide variety of applications. Particular mention might be made here of scratch-resistant topcoat materials for motor vehicles. In this context it is necessary in addition to differentiate between OEM coating materials and refinish coating materials. These coating materials differ primarily in their process temperature: while OEM coating materials are generally baked at 130-140° C.; refinish coating materials must be able to be processed at not more than 80° C.—even better would be 50° C., or even ambient temperature.

The great majority of the present commercial coatings for OEM and refinish are systems composed of isocyanate oligomers, in some cases the isocyanate groups of which are blocked, and hydroxy-functional polymers. These systems, however, still have a large number of various disadvantages.

For instance, on the one hand, the achievable scratch resistance is still not sufficient, so that, for example, in a car wash particles in the washing water cause noticeable scratching of the finish. Over time this permanently damages the gloss of the finish. Formulations would be desirable here that allow higher finish hardnesses to be achieved.

A further disadvantage of conventional automobile topcoat materials lies in the fact that they are solvent-based systems whose solids fraction is in some cases even below 60%. Because of the high molar masses of the uncrosslinked prepolymers and the correspondingly high viscosities and/or glass transition points thereof, it is virtually impossible to do without a solvent.

Finally, isocyanate-based systems possess the critical disadvantage that the isocyanate-containing components are not toxicologically unobjectionable and, moreover, have a strong sensitizing action. In the course of their use it is therefore necessary to take extensive precautionary measures in order to prevent inhalation of vapors or aerosols and to prevent skin contact. This is very inconvenient and expensive, particularly in the case of refinish applications. Replacing isocyanate-based coating materials by a more toxicologically unobjectionable system is desirable in any case.

The potential applications of scratch-resistant coatings are not restricted, however, to clearcoat materials for motor vehicles, but extend to many further areas: particularly for the scratch-resistant finishing of plastics, especially for transparent plastics such as corresponding polymethacrylates or polycarbonates, there is a high demand for coatings possessing superior scratch resistance.

On account of these disadvantages of the conventional isocyanate-based coating materials presently available commercially there is a keen search for new coating systems which no longer have the above-mentioned disadvantages. In the case of one very promising approach the starting-point compounds are organic oligomers or polymers which possess hydrolyzable silyl groups of the general formula (1).

$$-\text{Si}(\text{OR})_{3-x}\text{R}'_x \quad (1)$$

where:
R=alkyl or acyl radical
R'=alkyl, cycloalkyl or aryl radical
x=0 or 1.

These silyl groups are able in the presence of water—e.g., from atmospheric humidity—to undergo hydrolysis, with the formation of Si—OH functions, and subsequently to undergo condensation, with the formation of Si—O—Si bridges, as a result of which the coating cures. The silyl groups are attached in terminal or lateral position on the otherwise organic main chain of the oligomer or polymer, with bonding being via a hydrolysis-stable Si—C bond.

Polymers or oligomers which are able to crosslink to three-dimensional networks by groups of the general formula (1) are also referred to below as prepolymers.

In recent years a variety of coatings have been developed on the basis of such prepolymers, said coatings being distinguished not only by high hardness but also, in particular, by outstanding chemical resistance and weathering stability.

The hydrolyzable silane groups of the corresponding prepolymers are generally trimethoxysilyl groups or alkyldimethoxysilyl groups (general formula 1: R=methyl, x=0 or 1). For the preparation of the pre-polymers provided with these silane units it is possible to take a variety of pathways.

Thus, inter alia, EP-A-44 049, EP-A-267 698, EP-A-549 643 and U.S. Pat. No. 4,0413,953 describe coating formulations which comprise prepolymers which have pendent silane groups. These prepolymers are prepared by copolymerizing ethylenically unsaturated alkoxysilanes with other unsaturated compounds. Preferably silanes containing (meth)acrylic groups are copolymerized with other (meth)acrylates to give alkoxysilane-functional polymethacrylates. In such a reaction it is of course possible for further unsaturated compounds such as styrene, for example, to be copolymerized as well. Disadvantageous features of this process include the high molar masses which are obtained, meaning that the corresponding polymers can be handled only in solution form.

EP-A-1 123 951 describes coatings which in addition to the above-described alkoxysilane-functional polymethacrylates, and further coating constituents, also comprise silane-terminated prepolymers which have been prepared from a polyol or alcohol having at least 2 OH functions and from an isocyanate-functional alkoxy-silane. The coating materials prepared in that patent, however, are not solvent-free.

EP-A-571 073 describes silane-crosslinking coatings wherein the silane-terminated prepolymers are obtained by reacting isocyanates having tertiary isocyanate groups and amino-functional silanes. One of the disadvantages here is the difficulty of obtaining the tertiary isocyanates.

All of these attempts at producing coatings of high hardness which are suitable for producing scratch-resistant coatings and which crosslink via condensation of alkoxysilyl groups additionally have, without exception, a further critical disadvantage. Thus the preparation of the silane-functional polymers or oligomers starts exclusively from vinylsilanes of the general formula (2) or else from silanes containing groups corresponding to the general formula (3) which possess a propyl spacer between a heteroatom and the silyl group.

$$\text{vinyl-Si}(\text{OR})_{3-x}\text{R}'_x \quad (2)$$

$$-\text{X}-(\text{CH}_2)_3-\text{Si}(\text{OR})_{3-x}\text{R}'_x \quad (3)$$

where:
R=methyl radical,
R'=alkyl, cycloalkyl, aryl or alkylaryl radical,
X=oxygen, sulfur or a group of the formula NR",
R"=hydrogen, alkyl, cycloalkyl, aryl, aminoalkyl or aspartate ester radical,
x=0 or 1.

The reactivity of the silane-functional prepolymers obtained in this case, however, is no more than moderate. In order to achieve a sufficient cure rate with these components even at moderate temperatures of not more than 80° C. it is vital to add heavy metal catalysts—generally organotin compounds. Even at relatively high baking temperatures of 130-150° C. it is often not possible to do without heavy metal catalysts.

The avoidance of heavy metal catalysts—or at least a marked reduction in the amount of catalyst to be employed—would on the one hand be desirable from toxicological standpoints; on the other hand, the catalyst may also lower the storage stability of the coating formulation and the resistance of the cured coating material. For the same reasons the catalysis of film curing by strong organic bases such as 1,4-diazabicyclo[5.4.0]undec-7-ene (DBU) is likewise disadvantageous.

Furthermore, using the moderately reactive silanes of the general formulae (2) or (3), only methoxy-crosslinking prepolymers can be prepared, in other words prepolymers which give off methanol as they cure. Ethoxy-crosslinking systems, which give off the less toxicologically objectionable ethanol as they cure, are not possible, since compounds of the general formulae (2) or (3) with R=ethyl lack sufficient reactivities even in the presence of high concentrations of catalyst.

WO 92/20463 proposes adding the curing catalyst not to the topcoat material, with the silane-functional prepolymers present therein, but instead to a basecoat material. In a two-coat system first of all the basecoat, containing catalyst, is applied, and is subsequently covered with the topcoat material. Both coating films are dried or cured jointly, and the catalyst diffuses from the basecoat material into the topcoat film. Although this does allow the problem of the moderate storage stability of a one-component topcoat solution to be solved, it is not possible in this way to forego heavy metal catalysts or to achieve a reduction in the amount of catalyst.

DE-A-21 55 258 describes silane-terminated prepolymers which possess crosslinkable end groups of the general formula (4)

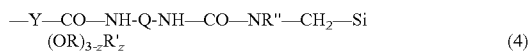
(4)

where:
Q=alkylene, cycloalkylene, arylene or alkylarylene radical,
R=alkyl radical, preferably methyl or ethyl radical,
R'=alkyl, cycloalkyl, aryl or alkylaryl radical,
R"=hydrogen, alkyl, cycloalkyl, aryl or aminoalkyl radical,
Y=oxygen or a group of the formula NR",
x=0 or 1.

These prepolymers are distinguished by very high reactivity on the part of the alkoxysilyl groups, so that these prepolymers cure in air even in the absence of heavy metal catalysts. Ethoxy-crosslinking pre-polymers containing such end groups are also described. The prepolymers described in DE-A-21 55 258, however, are suitable merely for producing elastic coatings, but not for producing scratch-resistant coatings. Thus in the case of these materials each crosslinkable silyl group is attached to the prepolymer either by way of two urea units or else by way of one urea unit and one urethane unit. Urea units and, albeit to a lesser extent, urethane units as well, however, have a capacity to form hydrogen bonds which increases the viscosity and also the glass transition point of the corresponding polymers. Consequently prepolymers having crosslinkable end groups of the general formula (4) either possess only a low crosslinkable alkoxysilyl group density or because of their high urea and urethane group density are vitreous solids and can be handled only in highly dilute solution. Accordingly all of the prepolymers described in DE-A-21 55 258, with end groups of the general formula (4), either possess only a very low fraction of alkoxysilyl groups, of less than 3% by weight, or are prepared and used only in high dilution, as a 30% strength toluenic solution. For producing highly crosslinked and hence scratch-resistant coatings from low-solvent coating formulations, these prepolymers are unsuitable.

Moreover, the compounds described in DE-A-21 55 258 with crosslinkable end groups of the general formula (4) have considerable stability problems. Although the reactivity of these alkoxysilyl groups is high it can be neither controlled nor modulated. Accordingly these compounds are storage-stable and handleable in air only with severe problems and also only in solutions containing alcohol and acid anhydride. Their further processing presents similar problems.

SUMMARY OF THE INVENTION

It was therefore an object of the invention to provide a hard coating with good scratch resistance, which can be produced from alkoxysilane-functional prepolymers and which does not have restrictions corresponding to those of the prior art. These and other objects are achieved by coating a substrate with crosslinkable prepolymer(s) bearing 2 or 3 reactive silyl groups —OR, bonded to the prepolymer through an intervening methylene group via —O—, —S—, or a single urethane linkage. Coating compositions employing the prepolymers can be used in low-solvent or solvent-free form, and cure readily at low temperatures to form coatings of high hardness values.

DETAILED DESCRIPTION OF THE PREFERRED EMBODIMENTS

The invention provides coating formulations (B) which are curable to coatings having a pencil hardness according to ISO 15184 of at least HB, which comprise prepolymers (A) which possess alkoxysilane functions of the general formula (6)

(6)

in which
R is hydrogen, alkyl, cycloalkyl or aryl radical having in each case 1 to 6 carbon atoms, the carbon chain being uninterrupted or interrupted by non-adjacent oxygen, sulfur or NR" groups,
R' is alkyl, cycloalkyl, aryl or arylalkyl radical having in each case 1 to 12 carbon atoms, the carbon chain being uninterrupted or interrupted by nonadjacent oxygen, sulfur or NR" groups,
R" is hydrogen, alkyl, cycloalkyl, aryl, aminoalkyl or aspartate ester radical,
X is oxygen, sulfur or a group of the general formula (20)

(20) and x is 0 or 1.

The curable coating formulations (B) can be used in low-solvent or solvent-free form. They can be formulated for high reactivity and cure to a scratch-resistant coating which has a pencil hardness according to ISO 15184 of at least HB.

In particular the preparation of the prepolymers (A) does not start from aminosilanes of the general formula (5)

NHR''—CH$_2$—Si(OR)$_{3-x}$R'$_x$ (5)

where R, R', R'' and x have the definitions described in connection with the general formula (6). In the case of applications of economic interest these aminosilanes would always be attached to the prepolymer through a reaction with isocyanate groups, with the formation of a urea unit.

The invention is based on the following, surprising discoveries. Firstly, it has been found that prepolymers (A) having alkoxysilyl groups of the general formula (1) which are attached via a methyl spacer to a heteroatom can have extremely high reactivities toward moisture. Surprisingly, however, these high reactivities occur only when acidic or basic compounds—such as, for example, aminosilanes of the general formula (5) are present, even if present only in traces. Although an extremely high reactivity of the prepolymers (A) is entirely advantageous in the context of the curing of of the curing of the prepolymer-containing coatings, the handleability of these highly reactive mixtures is extremely problematic. In the absence of any acids or bases, however, the prepolymers (A) have virtually no reactivity and can therefore be handled and stored without problems. This also allows effective modulability and/or controllability of the reactivity of the prepolymers (A) by means of the addition of suitable—e.g., weakly basic or acidic-catalysts.

A second, likewise surprising discovery is that solvent-free or low solvent coating formulations (B) can be produced with mixtures of prepolymers (A) having a very high density of alkoxysilyl groups of the general formula (1) which are attached via a methyl spacer to a heteroatom, while providing low viscosities, if the heteroatom is not a nitrogen atom that is part of a urea group. As a result of the low viscosity these prepolymers (A) can be used effectively in low-solvent or even in solvent-free coating systems. Coating formulations (B) of this kind, with mixtures of prepolymers (A) having a high density of alkoxysilyl groups of the general formula (1), in the course of their curing, form networks having a high network density, thereby resulting in very hard materials which are highly suitable for scratch-resistant coatings.

The group R preferably comprises methyl or ethyl radicals. The group R' preferably comprises a methyl, ethyl or phenyl radical. The group X preferably comprises oxygen or a group of the general formula (20). R'' preferably has 1 to 12 carbon atoms. R'' preferably comprises hydrogen.

The main chains of the alkoxysilane-terminated polymers (A) can be branched or unbranched. The average chain lengths may be adapted arbitrarily in accordance with the particular desired properties both of the uncross-linked mixture and of the cured coating. They may be composed of different building blocks. Thus the polymers in question may be, for example, polyethers, poly-esters, polyurethanes, polyureas, polyacrylates and polymethacrylates, polycarbonates, polystyrenes, poly-siloxanes, polysiloxane-urea/urethane copolymers, poly-amides, polyvinyl esters, polyvinyl hydroxides or polyolefins such as, for example, polyethylene, poly-butadiene, ethylene-olefin copolymers or styrene-butadiene copolymers. It is of course also possible to use any desired mixtures or combinations of polymers having different main chains. Similarly it is also possible to use any desired monomeric or oligomeric molecules having one or more alkoxysilane functions of the general formula (6) as prepolymers (A). Here as well arbitrary mixtures are possible.

The alkoxysilane groups of the general formula (6) may be situated terminally at the chain ends of the branched or unbranched main chains of the prepolymers (A). All or only some of the chain ends may be provided with alkoxysilane groups of the general formula (6). It is also possible, furthermore, for the alkoxysilane groups of the general formula (6) to be located laterally at the sides of the branched or unbranched main chains of the prepolymers (A).

In one preferred version of the invention the silane-functional prepolymers (A) are prepared using silanes of the general formulae (7) and (8):

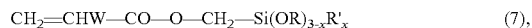
CH$_2$=CHW—CO—O—CH$_2$—Si(OR)$_{3-x}$R'$_x$ (7),

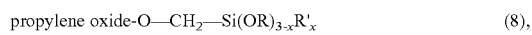
propylene oxide-O—CH$_2$—Si(OR)$_{3-x}$R'$_x$ (8), where W is a CH$_3$ group or hydrogen and where R, R' and x have the definitions described in connection with the general formula (6).

From the silane of the general formula (7) it is possible to prepare prepolymers (A) having lateral alkoxysilane groups of the general formula (6) by copolymerization with other unsaturated compounds, such as acrylic esters, methacrylic esters or styrene, for example.

From the silane of the general formula (8) it is possible to prepare prepolymers (A) having lateral alkoxysilane groups of the general formula (6) by copolymerization with other epoxides, such as ethylene oxide or propylene oxide. From the same silane it is possible to prepare prepolymers having terminal alkoxy-silane groups of the general formula (6), by reacting this silane with polyols having terminal OH groups or with monomeric alcohols, preferably having at least two OH groups.

In one particularly preferred version of the invention the silane-functional prepolymers (A) are prepared using silanes (A1) of the general formula (9):

OCN—CH$_2$—Si(OR)$_{3-x}$R'$_x$ (9), where R, R' and x have the definitions described in connection with the general formula (6).

The isocyanatosilane (A1) is reacted with an OH-functional prepolymer (A2). In terms of the chain length and the degree of branching of the OH-functional prepolymers (A2) there are no restrictions whatsoever.

Where the OH-functional prepolymer (A2) is a polymeric or oligomeric compound having lateral OH functions, prepolymers (A) having pendent alkoxysilane groups of the general formula (6) are obtained. Where, in contrast, the OH-functional prepolymer (A2) is a polymeric or oligomeric compound having terminal OH functions, prepolymers (A) are obtained which are terminated with alkoxysilane groups of the general formula (6). For the synthesis of the prepolymers (A) it is possible to use, in addition to the silane (A1), any desired mixtures of OH-functional prepolymers (A2) and/or monomeric alcohols.

If the molar amount of silane (A1) used is smaller or else the same size as the molar number of OH terminations of the prepolymer (A2), then NCO free prepolymers (A) are obtained.

If the OH-functional prepolymer (A2) has been synthesized from one or more polyols (A21)—preferably having at least two OH functions—and also from di- and/or polyisocyanates (A22), then it is not absolutely necessary to use these building blocks (A21, A22) to first prepare the OH-functional prepolymer (A2) which is subsequently reacted with the silane (A1) to form the finished prepolymer (A). But in this case as well it is possible to reverse the reaction steps, by reacting the polyols (A21) first with the isocyanatosilane (A1), and only subsequently reacting the resulting compounds with the di- or polyisocyanate (A22) to give the finished polymer (A).

Examples of customary diisocyanates (A22) are hexamethylene diisocyanate (HDI), isophorone diisocyanate (IPDI), diisocyanatonaphthalene (NDI), diisocyanatodiphenylmethane (MDI), both in the form of crude or technical MDI and in the form of pure 4,4' and/or 2,4' isomers or mixtures thereof, and also tolylene diisocyanate (TDI) in the form of its various regioisomers. Examples of polyisocyanates (A22) are polymeric MDI (p-MDI), triphenylmethane triisocyanate, biuret triisocyanates and all of the isocyanurates of the abovementioned diisocyanates. Particular preference is given to aliphatic diisocyanates such as IPDI or HDI and also to isocyanurates; or biuret compounds formed from these diisocyanates.

Particularly suitable polyols (A2 or A21) for preparing the prepolymers (A) include aromatic and aliphatic polyester polyols and polyether polyols and also hydroxyl-containing polyacrylates, such as are widely described in the literature. In principle, however, any polymeric, oligomeric or even monomeric alcohols having two or more OH functions can be used.

Instead of or alongside the OH-functional prepolymers (A2) and/or (A21) it is also possible to use all monomeric alcohols having one or—preferably—at least two OH functions in the preparation of the prepolymers (A). Examples that might be mentioned here include compounds such as ethylene glycol, glycerol, the various propane-, butane-, pentane- or hexanediol isomers, the various pentoses and hexoses, and also derivatives thereof, or else petaerythrotetraol. It is of course also possible to use mixtures of different polymeric and/or monomeric alcohols as polyol components (A2) and/or (A21).

Moreover, as well as the OH-functional polyols (A2, A21), in the preparation of the prepolymers (A) it is also possible to use polymeric or monomeric amines, preferably having at least two NH functions. The use of hydroxyalkyl- or aminoalkyl-terminated polydiorganosiloxanes is a further possibility.

In the preparation of the prepolymers (A) from isocyanatosilanes (A1) and OH-functional prepolymers (A2) it is preferred to use catalysts. Suitable catalysts in this case are all compounds known from polyurethane chemistry which catalyze the addition of alcohols to isocyanates. It is also possible, however, to do without a catalyst entirely when preparing the prepolymers (A) from isocyanatosilanes (A1) and OH-functional prepolymers (A2). In that case, however, it is advantageous to carry out the prepolymer preparation at elevated temperatures, in order to avoid excessively long reaction times.

In the case of one particularly preferred process the polymers (A) are prepared from isocyanatosilanes (A1) and OH-functional prepolymers (A2) in the presence of a tin catalyst. Examples of tin catalysts are organo tin compounds, such as dibutyltin dilaurate, dioctyltin dilaurate, dibutyltin diacetylacetonate, dibutyltin diacetate or dibutyltin dioctoate. Preference is given to using dibutyltin dilaurate. Preferably extremely small concentrations of tin catalysts are used, so that the tin content of the resulting polymers (A) is <500 ppm, preferably <100 ppm and more preferably <50 ppm.

The use of a tin catalyst in the synthesis of the polymers (A) is based on the surprising discovery that tin catalysts are only very poor catalysts of the curing reaction of the polymers (A). This finding is especially conspicuous on account of the fact that in the case of conventional silane-terminated polymers with silane terminations other than those of the general formula (6) tin compounds represent particularly efficient catalysts. The polymers (A), in contrast, are sufficiently slow to react even in the presence of the indicated concentrations of tin catalyst, and are activated only by the addition of a suitable basic catalyst.

In order to achieve rapid curing of the coating formulations (B) it is possible for them to include not only the alkoxysilane-functional prepolymers (A) but also catalysts (K) which accelerate the condensation reactions of the alkoxysilane groups of the general formula (6). Besides the tin catalysts already described above suitability is also possessed here by titanates, e.g., titanium(IV) isopropoxide, iron(III) compounds, e.g., iron(III) acetylacetonate, or else amines, particularly organic amines, e.g., aminopropyltri(m)ethoxysilane, N-(2-aminoethyl)amino-propyltri(m)ethoxysilane, N-alkylaminopropyltri(m)-ethoxysilanes, N,N-dialkylaminopropyltri(m)ethoxy-silanes, N,N-dialkylaminomethyltri(m)ethoxysilanes, triethylamine, tributylamine, 1,4-diazabicyclo[2.2.2]-octane, bis(N,N-dimethylaminoethyl)ether, N,N-bis(N,N-dimethyl-2-aminoethyl)methylamine, N,N-dimethylcyclohexylamine, N,N-dimethylpiperazines, tris(3-N,N-di-methylaminopropyl)amine, N,N-dimethylphenylamine, N,N-dimethylenthanolamine, N-ethylmorpholinine, N-methyl-morpholinine, 2,2-dimorpholinodiethyl ether, etc. Numerous further organic and inorganic heavy metal compounds and also organic and inorganic Lewis acids or bases, however, can be used here as well.

Naturally it is possible for the same catalysts already added during the synthesis of the prepolymer (A) to serve as curing catalysts (K).

Particularly preferred catalysts (K) are tertiary amines, examples being the tertiary amino compounds listed above. Because of the steric hindrance on the nitrogen atom, these tertiary amines possess a moderate catalytic activity, so that coatings having good curing properties combined with high storage stabilities and good processing properties result. By way of the extent of the steric shielding on the nitrogen atom it is possible here to control the catalytic activity of the catalyst (K).

The catalysts (K) are used preferably in concentrations of 0.01%-10% by weight, more preferably in concentrations of 0.01%-1% by weight, based on the coating formulation (B). The various catalysts can be used both in pure form and also as mixtures of different catalysts.

A further possibility is for the coating formulations (B) to also include one or more reactive diluents (R) in order to produce the coatings. Suitable reactive diluents (R) are in principle all low molecular mass compounds having a viscosity of preferably not more than 5 Pas, in particular not more than 1 Pas at 20° C., and which possess reactive alkoxysilyl groups via which they are incorporated into the nascent three-dimensional network as the coating cures. The reactive diluent (R) in this context may where appropriate serve not only to reduce the viscosity but also to enhance the properties of the cured coating. Thus it may also lead, for example, to a further increase in the alkoxysilyl group density in the coating formulation (B) and hence to a further increase in the network density in the cured coating. This may possibly result in an even higher hardness on the part of said coating. Additionally the reactive diluent (R) may serve simultaneously as an adhesion promoter and so enhance the adhesion of the coating on the respective substrate.

Preferred reactive diluents (R) are the inexpensive alkyltri(m)ethoxysilanes, such as methyltrimethoxy-silane, methyltriethoxysilane and also vinyltrimethoxy-silane, vinyltriethoxysilane, phenyltrimethoxysilane, phenyltriethoxysilane and also tetraethylsilane. Partial hydrolysates of these compounds can also be used as reactive diluents (R).

Likewise preferred are reactive diluents (R) which possess alkoxysilane functions of the general formula (6), e.g. reactive diluents (R) in the general formulae (10) or (11):

(10),

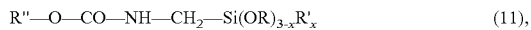
(11), where R, R', R" and x have the definitions indicated in connection with the general formula (6).

The reactive diluents (R) may be added only during the formulation of the coating formulations (B) or else as early as during the synthesis of the prepolymers (A).

The coating formulations (B) may comprise as binders exclusively the prepolymers (A) and, if desired, one or more reactive diluents (R). In that case it is also possible for different types of prepolymers (A) to be mixed with one another, examples being prepolymers (A) having a backbone based on poly(meth)acrylates, prepared using a (meth)acryloylsilane of the general formula (7), with prepolymers (A) prepared using an isocyanatosilane of the general formula (9).

Besides the prepolymers (A) and, where appropriate, one or more reactive diluents (B) it is also possible for the coating formulations (B) to include further binders (D) without alkoxysilane functions of the general formula (6). Suitable binders (D) include all of the binders known from paint preparation, examples being binders based on polyurethanes, polyacrylates or melamine resins and also binders which possess alkoxysilane groups that are not of the general formula (6).

The coating formulations (B) may either include solvent or be solvent-free. Suitable solvents in the first case are all of the solvents and solvent mixtures known from paint preparation. In one preferred version of the invention the coating formulations (B) are solvent-free.

The coating formulations (B) may further include the additives and additions that are customary in coating formulations. Mention might be made here, among others, of flow assistants, surface-active substances, adhesion promoters, light stabilizers such as UV absorbers and/or free-radical scavengers, thixotropic agents and also solids such as, for example, fillers or nanoparticles. In order to produce the particular desired profiles of properties both of the coating formulations (B) and also of the cured coatings such additions are generally unavoidable. Also, of course, the coating formulations (B) may comprise pigments.

The cured coating formulations (B) possess a high level of hardness, and so possess suitability for use as scratch-resistant coatings, e.g., as vehicle finishes, as scratch-resistant coatings on plastics or else as scratch-resistant coatings on wood. On the basis of their moderate crosslinking conditions the coating formulations (B) can be used as OEM coating materials and also as refinish coating materials.

Through the use of prepolymers (A) having a relatively low density of alkoxysilane groups of the general formula (6), however, it is also possible to produce coatings which as well as having a high level of hardness possess in particular high elasticity and good abrasion resistance.

A particular advantage of the coating formulations (B) lies in the reactivity—on the one hand controllable, on the other hand very high if required—of the prepolymers (A). Thus by adding suitable curing catalysts (K) it is possible to obtain coating formulations (B) which cure completely even at 50-80° C. or—with particular preference—even at as low as room temperature (20° C.). Through the use of different types of curing catalyst (K) and different concentrations of curing catalyst it is possible to adjust the respective curing time, in accordance with the requirement, between a few minutes and several hours.

A further important advantage of the adjustable—on demand—high reactivities of the prepolymers (A) lies in the fact that with these prepolymers ethoxy-crosslinking coating formulations (B) as well are possible, i.e., formulations which possess ethoxysilyl groups (R=ethyl in the general formula (6)). These formulations, on curing, release only ethanol and no methanol or only small quantities thereof. Ethoxy-crosslinking coating formulations (B) of this kind are likewise preferred.

The coating formulations (B) can be applied to the respective substrate by means of the customary methods, such as spraying, dipping, flow coating, knife coating or else spin coating techniques, for example.

All of the symbols in the above formulae exhibit their definitions in each case independently of one another. In all formulae the silicon atom is tetravalent.

Unless otherwise indicated all amounts and percentages in the examples below are by weight, all pressures are 0.10 MPa (abs.) and all temperatures are 20° C.

Example 1

Preparation of Isocyanatomethyltrimethoxysilane

Starting from chloromethyltrimethoxysilane methylcarbamatomethyltrimethoxysilane was synthesized by a known process (U.S. Pat. No. 3,494,951).

It was pumped in a stream of argon gas into a quartz pyrolysis tube packed with quartz wool. The temperature in the pyrolysis tube was between 420 and 470° C. The crude product was condensed at the end of the heated section by means of a condenser and collected. The colorless liquid was purified by distillation under reduced pressure. The desired product passed overhead at about 88-90° C. (82 mbar) in a purity of more than 99%, while the unreacted carbamate was reisolated at the bottom. It was passed back again directly to the pyrolysis.

In this way, starting from 56.9 g (273 mmol) of methylcarbamatomethyltrimethoxysilane, 33.9 g (191 mmol) of the desired isocyanatomethyltrimethoxysilane were obtained in a purity>97%. This corresponds to a yield of 70% of theory.

Example 2

Preparation of the Prepolymers (A) from a Polyol and a Silane of the General Formula (9)

A 250 ml reaction vessel with stirring, cooling and heating facilities was charged with 34.63 g (133.2 mmol) of a polyoxypropylated glycerol having an average molar mass of 260 g/mol, which was dewatered by heating at 100° C. under a membrane pump vacuum for one hour. Subsequently it was cooled to about 60° C. and at this temperature 0.025 g of dibutyltin dilaurate 64.49 g (400 mmol) of isocyanatomethyl trimethoxysilane were added under nitrogen. The temperature during this addition ought not to rise above 85° C. After the end of the addition stirring was continued at a temperature of 60° C. for a further 60 minutes. In the course of this procedure only the isocyanate function of the isocyanatomethyl trimethoxysilane reacted with the OH groups of the polyol. The reaction of the OH functions of the polyol with the trimethoxysilyl groups of the isocyanatomethyl trimethoxysilane, although conceivable in principle, could not be found within the bounds of measurement accuracy (NMR, HPLC-MS).

In the resulting prepolymer mixture no further isocyanate groups were detectable by IR spectroscopy. A clear, transparent mixture of methoxysilane-terminated prepolymers was obtained which had a viscosity of approximately 2.9 Pas at 20° C. Without the addition of a further catalyst this mixture exhibited a skin-forming time of several hours in air, and so could be handled and processed further without problems.

Example 3

Preparation of the Prepolymers (A) from a Polyol and a Silane of the General Formula (9)

The procedure described in Example 2 was repeated but with the addition of only 47.27 g (266.7 mmol) of isocyanatomethyltrimethoxysilane. At the stoichiometric ratio between the polyoxypropylated glycerol and the isocyanatomethyltrimethoxysilane it was possible on average for only two of the three OH functions of the polyol to react with an isocyanatomethyltrimethoxysilane to form a urea unit.

In the resulting prepolymer mixture no further isocyanate groups were detectable by IR spectroscopy. A clear, transparent mixture of methoxysilane-terminated prepolymers was obtained which had a viscosity of approximately 20 Pas at 20° C. Without the addition of a further catalyst this mixture exhibited a skin-forming time of several hours in air, and so could be handled and processed further without problems.

Example 4

Preparation of the Prepolymers (A) from an OH-Terminated Polyurethane and a Silane of the General Formula (9)

A 250 ml reaction vessel with stirring, cooling and heating facilities was charged with 30.00 g (115.4 mmol) of a polyoxypropylated glycerol having an average molar mass of 260 g/mol, which was dewatered by heating at 100° C. under a membrane pump vacuum for one hour. Subsequently it was cooled to about 60° C. and at this temperature 0.03 g of dibutyltin dilaurate and 7.30 g (43.4 mmol) of hexamethylene diisocyanate (HDI) were added under nitrogen. The temperature during this addition ought not to rise above 80° C. After the end of the addition stirring was continued at a temperature of 60° C. for a further 60 minutes.

This mixture was added at 60° C. under a nitrogen atmosphere to 45.97 g (259.4 mmol) of isocyanatomethyl-trimethoxysilane; the temperature during the addition again ought to remain below 80° C. The mixture was subsequently stirred at 60° C. for 60 minutes. In the course of this procedure only the isocyanate function of the isocyanatomethyltrimethoxysilane reacted with the OH groups of the polyol. The reaction of the OH functions of the polyol with the trimethoxysilyl groups of the isocyanatomethyltrimethoxysilane, although conceivable in principle, could not be found within the bounds of measurement accuracy (NMR, HPLC-MS).

In the resulting prepolymer mixture no further isocyanate groups were detectable by IR spectroscopy. A clear, transparent mixture was obtained which had a viscosity of approximately 9 Pas at 20° C. Without the addition of a further catalyst this mixture exhibited a skin-forming time of several hours in air, and so could be handled and processed further without problems.

Example 5

Preparation of the Prepolymers (A) from an OH-Terminated Polyurethane and a Silane of the General Formula (9)

The procedure described in Example 4 was repeated but in the first reaction step no HDI was used; instead, 9.65 g (43.4 mmol) of isophorone diisocyanate (IPDI) were added.

In the resulting prepolymer mixture no further isocyanate groups were detectable by IR spectroscopy. A clear, transparent mixture was obtained which had a viscosity of approximately 43 Pas at 20° C. Without the addition of a further catalyst this mixture exhibited a skin-forming time of several hours in air, and so could be handled and processed further without problems.

Example 6

Preparation of Prepolymers (A) Having Ethoxysilane Functions from an OH-Terminated Polyurethane and a Silane of the General Formula (9)

The procedure described in Example 4 was repeated but in the second reaction step no isocyanatomethyl-trimethoxysilane was used; instead, 56.89 g (259.4 mmol) of isocyanatomethyltriethoxysilane were added.

In the resulting prepolymer mixture no further isocyanate groups were detectable by IR spectroscopy. A clear, transparent mixture was obtained which had a viscosity of approximately 30 Pas at 20° C. Without the addition of a further catalyst this mixture exhibited a skin-forming time of several hours in air, and so could be handled and processed further without problems.

Comparative Example 1

Preparation of Noninventive Prepolymers (A) from a Polyol and a γ-isocyanatopropylsilane The procedure described in Example 2 was repeated but in this case no isocyanatomethyltrimethoxysilane was used; instead, 82.11 g (400 mmol) of γ-isocyanato-propyltrimethoxysilane were added.

In the resulting prepolymer mixture no further isocyanate groups were detectable by IR spectroscopy. A clear, transparent mixture was obtained which had a viscosity of approximately 1.6 Pas at 20° C. This mixture had virtually no reactivity and can be handled in air for several hours without problems.

Comparative Example 2 (Noninventive)

Preparation of Prepolymers (A) Having from an OH-Terminated Polyurethane and a γ-isocyanatopropylsilane The procedure described in Example 4 was repeated but in the second reaction step no isocyanatomethyl-trimethoxysilane was used; instead, 53.25 g (259.4 mmol) of γ-isocyanato-propyltrimethoxysilane were added.

In the resulting prepolymer mixture no further isocyanate groups were detectable by IR spectroscopy. A clear, transparent mixture was obtained which had a viscosity of approximately 32.32 Pas at 20° C. This mixture had virtually no reactivity and can be handled in air for several hours without problems.

Comparative Example 3 (Noninventive)

Preparation of Prepolymers (A) from an NCO-Terminated Polyurethane and an Aminosilane A 250 ml reaction vessel with stirring, cooling and heating facilities was charged with 30 g (70.6 mmol) of a polypropylene glycol having an average molar mass of 425 g/mol, which was dewatered by heating at 100° C. under a membrane pump vacuum for one hour. Subsequently it was cooled to about 50° C. and at this temperature 23.75 g (141.2 mmol) of hexamethylene diisocyanate (HDI) were added under nitrogen at a rate such that the temperature did not climb above 80° C. After the end of the addition stirring was continued at 80° C. for 15 minutes.

The mixture was cooled to about 50° C. and 5 ml of vinyltrimethoxysilane were added as reactive diluent. This was followed by the dropwise addition of 32.95 g (141.2 mmol) of N-cyclohexylaminomethyltrimethoxysilane and subsequent stirring at 80° C. for 60 minutes.

In the resulting prepolymer mixture no further isocyanate groups were detectable by IR spectroscopy. However, in spite of the addition of vinyltrimethoxy-silane, the viscosity was already >>100 Pas at 20° C. Also the mixture was of such high reactivity that it could no longer be processed. Coatings could not be produced with this material.

Example 6

Production of Coatings

The prepolymers in the preceding examples were diluted in accordance with the figures in Table 1, where appropriate, with a solvent (2K diluent; Herberts) or with methyltrimethoxysilane (M-TMO), vinyltrimethoxy-silane (V-TMO) or tetraethoxysilane (TES), and admixed where appropriate with bis(2-dimethylaminoethyl)ether as a curing catalyst. All of the amounts indicated in Table 1 refer to the amounts by weight that were used.

The finished coating materials were then coated onto aluminum test panels (Pausch Messtechnik) using an Erichsen "Coatmaster 509 MC" film drawer, with a wet film thickness of 120 μm. The resulting coating films were dried at room temperature or at 80° C. in accordance with the indications in Table 1.

The coatings comprising prepolymers (A) from Examples 2-5 were fully cured without exception after 20-30 minutes. A corresponding listing of the coatings produced is found in Table 1. In contrast, from the prepolymers of the noninventive Comparative Examples 1 and 2, irrespective of the drying temperature and the amounts of catalyst used, the coatings obtained were without exception still soft and tacky even after several days.

TABLE 1

| Coating number | Prepolymer | Reactive diluent | Solvent | Catalyst | Curing temperature |
|---|---|---|---|---|---|
| 2-80-Cat-RT | Ex. 2 80 p | V-TMO 20 p | — | 0.5 p | Room temperature |
| 2-68-Cat-Rt | Ex. 2 68 p | V-TMO 32 p | — | | Room temperature |
| 2-80-Cat-80 | Ex. 2 80 p | V-TMO 20 p | — | 0.5 p | 80° C. |
| 2-80L-Cat-Rt | Ex. 2 80 p | — | 2K diluent 20 p | 0.5 p | Room temperature |
| 3-80-Cat-Rt | Ex. 3 80 p | V-TMO 20 p | — | 0.5 p | 60° C. |
| 4-60-Rt | Ex. 4 60 p | V-TMO 40 p | — | — | Room temperature |
| 4-60-60 | Ex. 4 60 p | V-TMO 40 p | — | — | 60° C. |
| 4-80-Cat-Rt | Ex. 4 80 p | V-TMO 20 p | — | 0.5 p | Room temperature |
| 4-60-Cat-Rt | Ex. 4 60 p | V-TMO 40 p | — | 0.5 p | Room temperature |
| 4-60-Cat-60 | Ex. 4 60 p | V-TMO 40 p | — | 0.5 p | 60° C. |
| 4-60M-Cat-60 | Ex. 4 60 p | M-TMO 40 p | — | 0.5 p | 60° C. |
| 5-80-Cat-60 | Ex. 5 80 p | V-TMO 20 p | — | 0.5 p | 60° C. |
| 5-80L-Cat-60 | Ex. 5 80 p | — | 2K diluent 20 p | 0.5 p | 60° C. |
| 6-50-Cat-Rt | Ex. 6 50 p | TES 25 p | Ethanol 25 p | 0.5 p | Room temperature | p = part(s)

Example 7

Determining the Pencil Hardnesses of the Coatings

The pencil hardnesses of the above-described coatings were performed along the lines of ISO 15184. The hardness test was carried out using an Erichsen scratch hardness tester model 291. In the course of this test pencils with graded levels of hardness were advanced over the test layer at a fixed angle of attack and with a defined load. The film hardness was determined by the two levels of hardness at the boundary between scribe effect and penetration effect.

The results are divided into the following degrees of hardness:

6*B*-5*B*-4*B*-3*B*-2*B*-*B*-H*B*-F-H-2H-3H-4H-5H-6H-7H-8H-9H softer                                                                          harder The corresponding measurements were carried out both with coatings 1 day old and with coatings 2 weeks old. The values obtained are listed in Table 2. In coatings with an age of more than 2 weeks it was no longer possible to detect any changes.

Example 8

Determining the Coating Adhesion to Aluminum

The adhesion of the coatings of the invention to aluminum and steel were performed along the lines of DIN 53151.

The adhesion test was carried out using an Erichsen cross hatch cutter model 295 with a 1 mm blade spacing. Using the cross hatch tester, 2 cuts down to the substrate were made at right angles to one another, to form a cross hatch. Using a manual brush, brushing was carried out 5 times back and forth in a diagonal direction or loose parts were removed with adhesive tape. The processed area was examined using a magnifying glass.

The degree of adhesion was classified by comparison in accordance with different characteristic values:

5B—The cut edges are completely smooth, no segment of the coating has flaked off.

4B—Small fragments of the coating material have flaked off at the points where the cross hatch lines intersect. About 5%

3B—The coating material has flaked off along the cut edges and/or at the intersection points of the cross hatch lines. About 5-15%

2B—The coating material has flaked off in some cases completely or in broad strips along the cut edges. About 15-35%

1B—The coating material has flaked off in some cases completely or in broad strips along the cut edges. About 35 to 65%

The corresponding measurements were carried out both with coatings 1 day old and with coatings 2 weeks old. The values obtained are listed in Table 2. In coatings with an age of more than 2 weeks it was no longer possible to detect any changes.

TABLE 2

| Coating number | Pencil hardness after 1 day | Pencil hardness after 14 days | Degree of adhesion after 1 day | Degree of adhesion after 14 days |
|---|---|---|---|---|
| 2-80-Cat-RT | 3H | 5H | 5B | 5B |
| 2-68-Cat-Rt | 3H | 4H | 5B | 5B |
| 2-80-Cat-80 | 4H | 5H | 5B | 5B |
| 2-80L-Cat-Rt | 3H | 3H | 4B | 4B |
| 3-80-Cat-60 | 3H | 3H | 5B | 5B |
| 4-60-Rt | B | H | 5B | 5B |
| 4-60-60 | F | H | 5B | 5B |
| 4-80-Cat-Rt | 2H | 3H | 5B | 5B |
| 4-60-Cat-Rt | 2H | 4H | 5B | 5B |
| 4-60-Cat-60 | 3H | 4H | 5B | 5B |
| 4-60M-Cat-60 | 3H | 3H | 5B | 5B |
| 5-80-Cat-60 | 3H | 4H | 5B | 5B |
| 5-80L-Cat-60 | 3H | 3H | 5B | 5B |
| 6-50-Cat-Rt | 3H | 4H | 5B | 5B |

For comparison purposes the pencil hardnesses of a number of commercially available topcoat materials were also measured. In the case of conventional polyurethane OEM coating materials—produced at baking temperatures of 130-150° C.—pencil hardnesses between HB and H were found. In the case of conventional refinish materials—produced at dry temperatures of 80° C.—pencil hardnesses of between B and HB were found.

The invention claimed is:

1. A process for preparing a coating on a substrate, comprising applying a coating formulation (B) which is storage stable but which cures in the presence of moisture to a coating having a pencil hardness according to ISO 15184 of at least HB to the substrate, the coating formulation comprising at least one prepolymer (A) which bears at least one hydrolyzable functionality of the formula (6)

$$—X—CH_2—Si(OR)_{3-x}R'_x \qquad (6)$$

in which

R each, independently, is hydrogen, or an alkyl or cycloalkyl radical having 1 to 6 carbon atoms, the carbon chain being uninterrupted or interrupted by non-adjacent oxygen, sulfur or NR" groups, R' each, independently, is an alkyl, cycloalkyl, aryl or arylalkyl radical having 1 to 12 carbon atoms, the carbon chain being uninterrupted or interrupted by nonadjacent oxygen, sulfur or NR" groups, X is oxygen or a group of the formula (20)

$$—O—CO—NR"— \qquad (20)$$

wherein

R" each, independently, is hydrogen, an alkyl, cycloalkyl, aryl, aminoalkyl or aspartate ester radical, and x is 0 or 1, wherein at least one silicon-bonded alkoxy group is present as a hydrolyzable functionality, wherein the hydrolyzable functionality (6) is derived by preparing the prepolymer (A) from at least one α-silane selected from the group consisting of the formulae $$\text{propylene oxide-O}—CH_2—Si(OR)_{3-x}R'_x \qquad (8),$$

and $$OCN—CH_2—Si(OR)_{3-x}R'_x \qquad (9),$$

and curing the coating by exposure to moisture.

2. The process of claim 1, wherein the group R is a methyl or ethyl radical.

3. The process of claim 1, wherein the silane-functional prepolymers (A) are prepared using at least one silane of the formula (8)

$$\text{propylene oxide-O}—CH_2—Si(OR)_{3-x}R'_x \qquad (8).$$

4. The process of claim 2, wherein the silane-functional prepolymers (A) are prepared using at least one silane of the formula (8)

$$\text{propylene oxide-O}—CH_2—Si(OR)_{3-x}R'_x \qquad (8).$$

5. The process of claim 1, wherein the prepolymer (A) is a silane-functional base polymer selected from the group consisting of polyethers, polyurethanes, polyureas, polycarbonates, polysiloxanes, polysiloxane-urea/urethane copolymers, polyamides, and mixtures thereof.

6. The process of claim 1, wherein the coating formulation (B) further comprises at least one catalyst (K) which accelerates the curing of the prepolymer(s) (A).

7. The process of claim 2, wherein the coating formulation (B) further comprises at least one catalyst (K) which accelerates the curing of the prepolymer(s) (A).

8. The process of claim 6, wherein at least one catalyst (K) is an organic amine.

9. The process of claim 8, wherein the organic amine is a tertiary amine.

10. The process of claim 1, wherein the coating formulation (B) further comprises at least one reactive diluent which is a low molecular weight compound having a molecular weight such that the viscosity is not more than 5 Pas at 20° C. and which possesses reactive alkoxysilyl groups which are incorporated into a three-dimensional network as the coating cures.

11. The process of claim 9, wherein at least one reactive diluent is selected from the group consisting of alkyltrimethoxysilanes, alkyltriethoxysilanes, vinyltrimethoxysilane, vinyltriethoxysilane, phenyltrimethoxysilane, phenyltriethoxysilane, tetraethoxysilane, and compounds of the formulae (10) and (11)

$$R"—O—CH_2—Si(OR)_{3-x}R'_x \qquad (10),$$

$$R"—O—CO—NH—CH_2—Si(OR)_{3-x}R'_x \qquad (11).$$

12. The process of claim 1, wherein the coating formulations (B) further comprise at least one binder (D) bearing no hydrolyzable functionalities of the general formula (6).

13. The process of claim 1, wherein the coating formulation (B) is solvent-free.

14. The process of claim 1, wherein R is ethyl.

15. The process of claim 1, wherein the coating formulation is free of an amount of tin curing catalyst which is effective for accelerating moisture curing of the formulation.

16. The process of claim 1, wherein the coating formulation, prior to applying, is admixed with a basic or acidic curing catalyst.

17. The process of claim 2, wherein the storage stable coating formulation contains at least one tertiary amine curing catalyst.

18. A process of claim 1, comprising applying to the substrate a coating formulation (B) which is storage stable but which cures in the presence of moisture to a coating having a pencil hardness according to ISO 15184 of at least HB, the coating formulation comprising at least one prepolymer (A) which bears at least one hydrolyzable functionality of the formula (6)

$$—X—CH_2—Si(OR)_{3-x}R'_x \qquad (6)$$

in which

R each, independently, is hydrogen, or an alkyl or cycloalkyl radical having 1 to 6 carbon atoms, the carbon chain being uninterrupted or interrupted by non-adjacent oxygen, sulfur or NR" groups, R' each, independently, is an alkyl, cycloalkyl, aryl or arylalkyl radical having 1 to 12 carbon atoms, the carbon chain being uninterrupted or interrupted by nonadjacent oxygen, sulfur or NR" groups, X is oxygen or a group of the formula (20)

$$—O—CO—NR"— \qquad (20)$$

wherein

R" each, independently, is hydrogen, an alkyl, cycloalkyl, aryl, aminoalkyl or aspartate ester radical, and x is 0 or 1, and wherein at least one silicon-bonded alkoxy group is present as a hydrolyzable functionality, further comprising at least one reactive silane diluent selected from the group consisting of alkyltri(m)ethoxysilanes, vinyltri(m)ethoxysilanes, phenyltri(m)ethoxysilanes, and diluents of the formula (10) and (11)

$$R"—O—CH_2—Si(OR)_{3-x}R'_x \qquad (10),$$

$$R"—O—CO—NH—CH_2—Si(OR)_{3-x}R'_x \qquad (11),$$

and curing the coating on the substrate by exposure to moisture.

19. The process of claim 18, further comprising curing the coating at a curing temperature of about 80° C. or less.

20. The process of claim 19, wherein curing takes place at room temperature.

* * * * *